No. 758,862. PATENTED MAY 3, 1904.
E. C. SHAW.
VULCANIZER DOOR LOCKING DEVICE.
APPLICATION FILED JUNE 17, 1903. RENEWED MAR. 10, 1904.
NO MODEL. 2 SHEETS—SHEET 1.
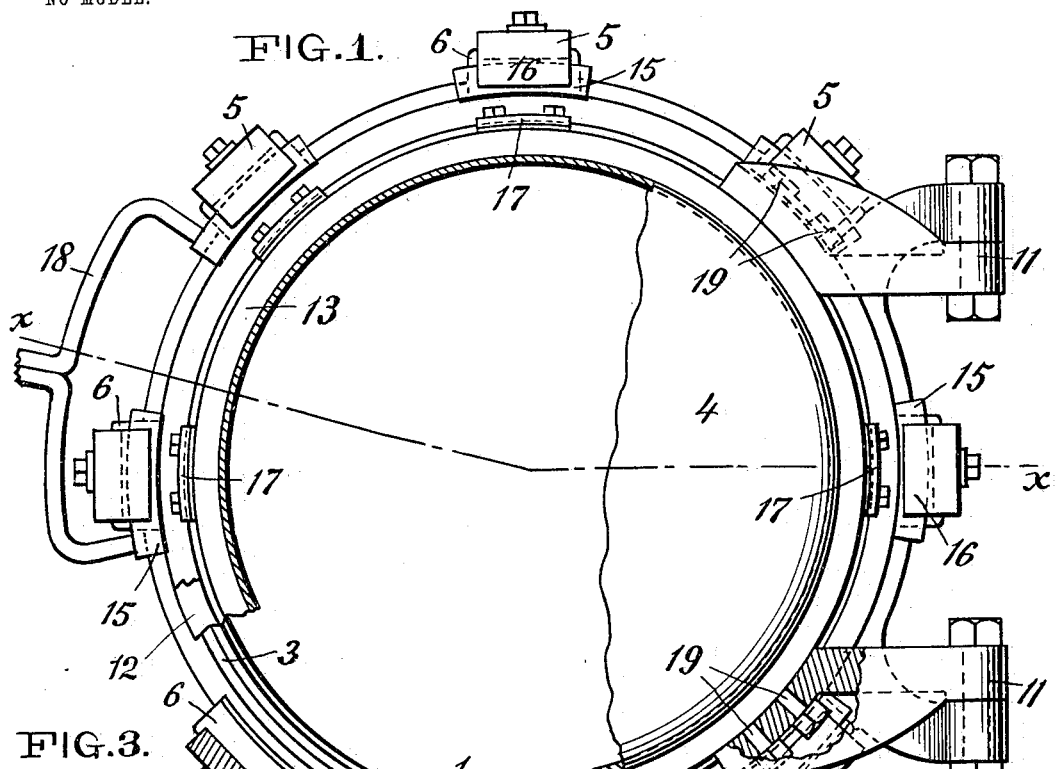
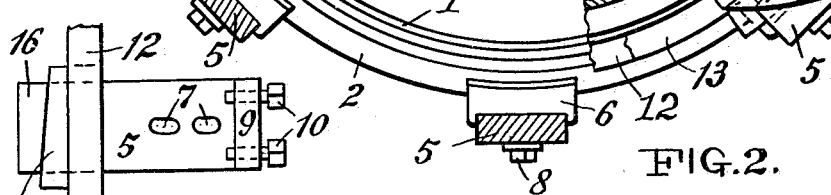
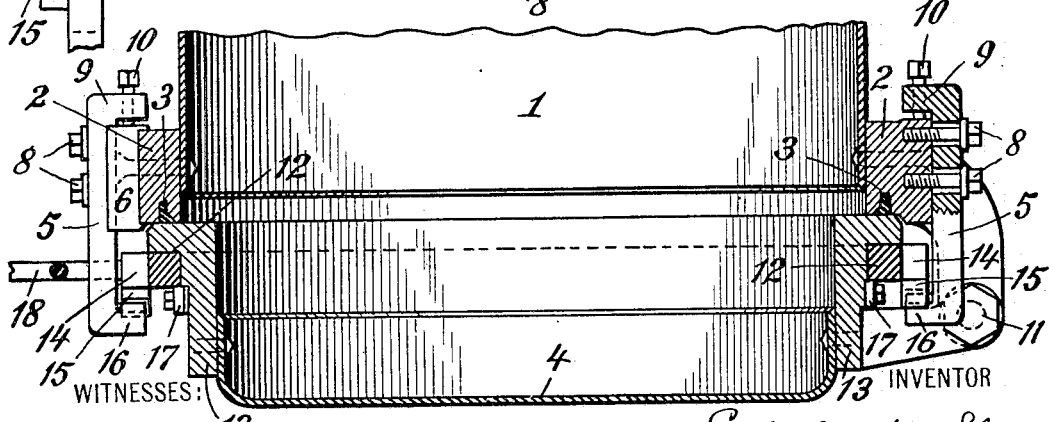
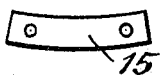
WITNESSES:
Oliver Williams
Alvin K. Goodwin
INVENTOR
Edwin Copeland Shaw
BY Seward Davis
ATTORNEY
THE NORRIS PETERS CO., PHOTO-LITHO., WASHINGTON, D. C.

No. 758,862. PATENTED MAY 3, 1904.
E. C. SHAW.
VULCANIZER DOOR LOCKING DEVICE.
APPLICATION FILED JUNE 17, 1903. RENEWED MAR. 10, 1904.
NO MODEL. 2 SHEETS—SHEET 2.
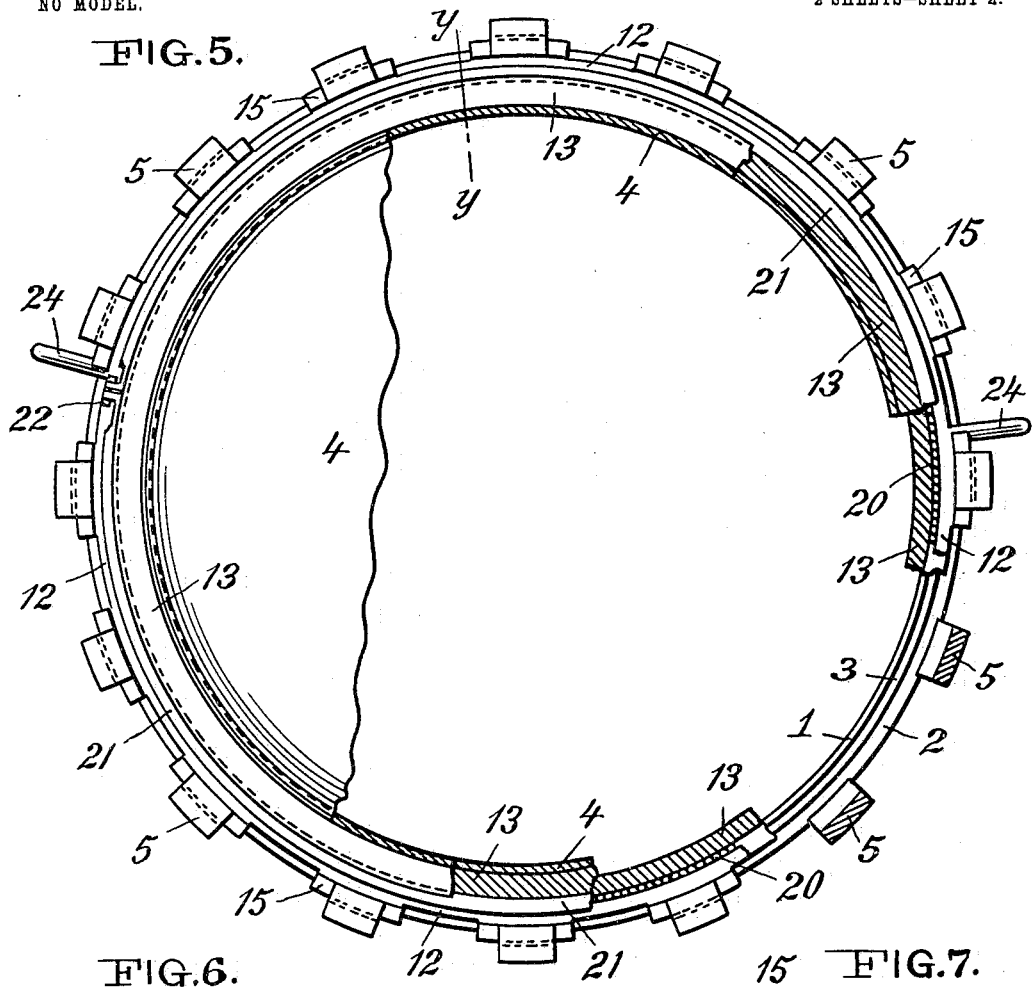
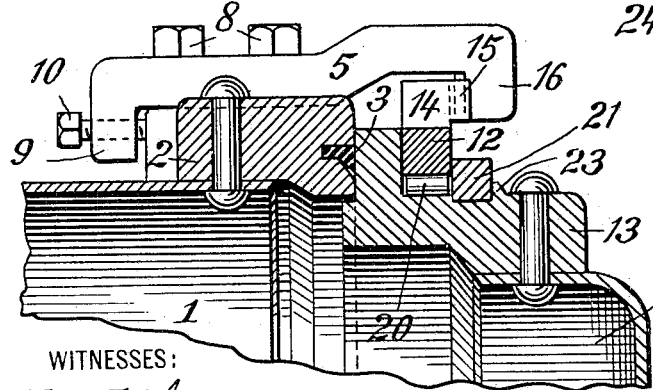
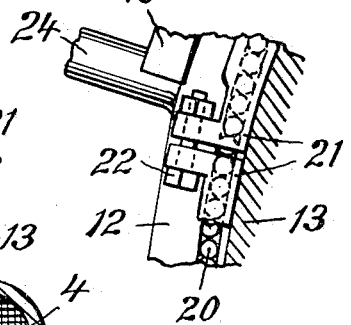
WITNESSES:
Alvin K. Goodwin
Oliver Williams
INVENTOR
Edwin Copland Shaw
BY Seward Davis
ATTORNEY No. 758,862.

Patented May 3, 1904.

UNITED STATES PATENT OFFICE.

EDWIN COUPLAND SHAW, OF AKRON, OHIO, ASSIGNOR TO THE B. F. GOODRICH COMPANY OF OHIO, OF AKRON, OHIO, A CORPORATION OF OHIO.

VULCANIZER-DOOR-LOCKING DEVICE.

SPECIFICATION forming part of Letters Patent No. 758,862, dated May 3, 1904.

Application filed June 17, 1903. Renewed March 10, 1904. Serial No. 197,585. (No model.)

*To all whom it may concern:*

Be it known that I, EDWIN COUPLAND SHAW, a citizen of the United States of America, residing at the city of Akron, county of Summit, and State of Ohio, have invented certain new and useful Improvements in Vulcanizer-Door-Locking Devices, of which the following is a specification.

This invention relates to vulcanizers for rubber goods, and has for its object to provide simple and efficient devices assuring quick unlocking and opening and quick closing and tight locking of vulcanizer-doors to facilitate successive and economical vulcanizing operations in the same apparatus. This object is attained by my invention, which specially makes one series of inclined locking-faces adjustable relatively to the corresponding series of inclined locking-faces, so that when the two series of locking-faces are properly alined and addressed to each other each and every cooperating pair of locking-faces will simultaneously engage to substantially the same frictional degree all around the vulcanizer-door. The door will thus be closed to its steam-tight packing with substantially equal force and tightness at all points of contact, and the thrusts arising either from closing the door or from steam-pressures generated within the vulcanizer will be evenly distributed all around the door, which will remain tightly and securely closed while rubber goods are being cured in the vulcanizer. In the best development of the invention one series of inclined locking-faces are arranged upon a ring, which preferably is revoluble upon ball-bearings held to the door to cause engagement of its inclined locking-faces with those on the vulcanizer-body, said locking-faces on the body being preferably formed upon a series of thrust-blocks which are longitudinally adjustable to provide for nicety of relative adjustment of the two series of locking-faces on the vulcanizer body and door, respectively.

The invention also includes various details of construction, all as hereinafter described and claimed.

Reference is made to the accompanying drawings, forming part of this specification, and in which—

Figure 1 is a front end view of a horizontal vulcanizer and its closed hinged door, parts being broken away and in section. Fig. 2 is a sectional plan view taken on the line $x$ $x$ in Fig. 1. Fig. 3 is a detail inner face view of one of the vulcanizer-body thrust-blocks or keepers and a portion of the door-latch ring with their inclined or wedging faces engaged as when locking the door. Fig. 4 is a face view of one of the hard-steel wedge-blocks preferably used on the door-latch ring. Fig. 5 is a front end view of a larger horizontal vulcanizer having a hingeless door, parts being broken away and in section. Fig. 6 is an enlarged longitudinal detail view in cross-section on the line $y$ $y$ in Fig. 5, and Fig. 7 is a front detail sectional view more especially illustrating the antifriction-bearings of the door-latch ring shown in Figs. 5 and 6.

I will first describe the small or medium-size hinged door, with more especial reference to Figs. 1 to 4 of the drawings. The numeral 1 indicates the vulcanizer-body, to the outer end of which is rigidly fixed a heavy reinforcing metal band 2, which at its outer edge is fitted with a steam-packing ring 3. This band 2 supports a number of thrust-blocks or keepers 5, which are preferably adjustable longitudinally in grooves of guide-lugs 6, formed on the band 2. These keepers preferably have two slots 7, receiving corresponding bolts 8, which pass into the band 2 or its lugs 6 to hold the keepers in their guides. At its inner end each keeper has a lateral lug 9, into which are fitted from the rear two bolts 10, bearing on the rear face of the band 2 or its lug 6. The bolts 10 primarily take the door-locking thrust and also serve to set the keepers longitudinally prior to finally fastening them by the bolts 8 to hold said keepers in proper relation to the door-hinges 11 and its preferred latch-ring 12. This latch-ring is fitted revolubly in a bearing on the door-rim 13 and has a series of lugs 14, to each of which is preferably fitted a hardened-steel wedge 15, presenting its inclined face to the inclined face of a lateral lug 16, formed on the corresponding keeper 5, as shown in Fig. 3 of the drawings. The latch-ring 12 is held snugly to its bearing on the door-rim 13 by a number of metal blocks 17, bolted to the rim. The latch-ring is preferably provided with a lever 18 for turning it on the door-rim. As this lever has considerable length to permit easy turning of the latch-ring by it, I prefer to fork the inner end of the lever and give it two points of connection to the latch-ring. The forked end of the lever also gives it play over one of the keepers 5, which it straddles, as more clearly shown in Figs. 1 and 2 of the drawings. I fasten one-half of each of the two door-hinges 11 by adjustable connections, preferably bolts 19, entering the door-rim 13, as shown in Fig. 1 of the drawings. This allows the hinge connection of the door 4 to the vulcanizer-body 1 to be made after the keepers 5 have been adjusted longitudinally to hold their inclined lugs 16 in proper relation to the coöperating latch-ring inclines or wedges 15, thereby avoiding all binding at the hinges and assuring uniformly tight locking of the door all around by uniform action of all the latch-ring wedges 15 on all the keeper-lugs 16, while permitting secure hinge connection of the door to the press-body and allowing it to be easily and quickly swung open and shut on the hinges.

For larger vulcanizers—say four feet and more in diameter—I prefer to use the hingeless form of door shown in Figs. 5, 6, and 7 of the drawings and which will be held by any suitable sling-hoist, so as to be raised and swung aside or clear from the open front end of the vulcanizer. In this structure the metal band 2 on the vulcanizer-body 1 and the rim 13 on the door 4 are slightly modified in form, while the steam-packing 3, the keepers 5, having lugs 9 16, fastening-bolts 8, and setting-bolts 10 are similar to correspondingly-numbered parts above described. The latch-ring 12, having lugs 14, provided with inclined faces or wedges 15, engaging the inclined faces of the keeper-lugs 16, is here fitted for partial rotation on an antifriction-bearing, preferably comprising a series of steel rollers 20, interposed between the latch-ring and the door-rim 13 and held in place by a divided retaining-ring 21, drawn tightly to the door-rim by a bolt 22, fitted in end lugs of the retainer. This retaining-ring 21 is preferably seated in a groove in the door-rim, having a quite high wall or shoulder 23, which, together with the wide overlap of the inner side of the retainer on the outer face of the latch-ring, prevents displacement of the latter by pressure brought upon it when its wedging-faces 15 engage those, 16, of the keepers 5 on the vulcanizer-body. Comparatively short handles 24, radiating from opposite side portions of the latch-ring, afford sufficient leverage for easily turning it in opposite directions for locking and unlocking this door.

The operation of locking and unlocking is the same for the hinged and hingeless doors. Suppose the door is shut and securely locked by mutual engagement of the wedging-surfaces of the latch-ring and keepers, as shown in drawings. To unlock the door, it is only necessary to turn the latch-ring 12 by the lever 18 or handles 24 to disengage the inclined wedging-faces 15 of the latch-ring lugs from the inclined wedging-faces of the keeper-lugs 16 and carry the lately-opposed lugs out of register, whereupon the door 4 may be quickly swung open laterally on its hinges or may be quickly lifted or removed by the sliding hoist to fully open the end of the vulcanizer. After the rubber-holding molds are charged into the vulcanizer the door may be at once swung shut on its hinges or may be replaced by the sling-hoist to allow the latch-ring 12 to be turned a little in reverse direction to again engage its inclined lugs or faces 15 with inclined lugs of the keepers 5 to lock the door closed tightly all around. The forcing of the packing-ring 3 against the door by pressure of steam admitted to the vulcanizer doubly assures a steam or vapor tight joint of the door with the vulcanizer-body. The longitudinal strain or thrust on the keepers 5, due to engagement with them of the latch-ring wedging-surfaces, is taken finally on the heavy body-rim 2 through the set-bolts 10, and these bolts may at any time be adjusted for most accurately regulating the positions of the inclined keeper-lugs relatively to the latch-ring wedging-surfaces to permanently secure a positively tight locking of the vulcanizer-door all around its joint with the vulcanizer-body. The antifriction-bearing for the latch-ring 20 may also be used on the smaller hinged doors, as will readily be understood.

It is obvious that the locking-ring having inclined wedging-surfaces may be pivoted to the door to turn on the pivot during locking and unlocking of the door. Furthermore, the locking-ring may be fitted to turn on the vulcanizer-body, and the corresponding keepers may be located on the door, the effect being substantially as above described for the more convenient and preferred arrangement shown in the drawings. The coöperation of the packing-ring 3 with the mutually-engaging inclined locking faces or parts on the door and vulcanizer-body assures a permantly tight closure of the door-joint by expansion of the packing-ring by pressure of steam or vapor within the closed vulcanizer.

This invention while more especially adapted for vulcanizers is not limited to them, as it may be adopted with advantage for closing the doors of retorts, digesters, or other steam, gas, or chemical apparatus.

I claim as my invention—

1. Vulcanizer-door-locking devices comprising a series of longitudinally-adjustable spaced keepers held to the vulcanizer-body and having inclined faces, and a corresponding series of relatively movable spaced lugs on the door having inclined faces adapted to engage the inclined faces of the keepers, said keepers having means taking the door-locking thrust and providing for setting them relatively to the coöperating door-lugs, substantially as described.

2. Vulcanizer-door-locking devices comprising a series of longitudinally-adjustable spaced keepers held to the vulcanizer-body and having inclined faces, and a corresponding series of relatively movable spaced lugs on the hinged door having inclined faces adapted to engage the inclined faces of the keepers; said keepers having means taking the door-locking thrust and providing for setting them relatively to the coöperating door-lugs; the hinges of the door having parts finally attachable after the keepers are adjusted to the door-lugs, substantially as described.

3. Vulcanizer-door-locking devices comprising a series of spaced keepers held to the vulcanizer-body and having inclined faces, and a latch-ring fitted revolubly to the door and having a series of spaced lugs provided with inclined faces adapted to simultaneously engage the inclined faces of all the keepers, substantially as described.

4. Vulcanizer-door-locking devices comprising a series of spaced keepers held to the vulcanizer-body and having inclined faces, and a latch-ring fitted revolubly to the door and having a series of spaced lugs provided with inclined faces adapted to simultaneously engage the inclined faces of all the keepers, said latch-ring also having a lever or handle for turning it on the door, substantially as described.

5. Vulcanizer-door-locking devices comprising a series of longitudinally-adjustable spaced keepers held to the vulcanizer-body and having inclined faces, and a latch-ring fitted revolubly to the door and having a series of spaced lugs provided with inclined faces adapted to simultaneously engage the inclined faces of all the keepers, said keepers having means taking the door-locking thrust and providing for setting them relatively to the coöperating inclined faces of the latch-ring lugs, substantially as described.

6. Vulcanizer-door-locking devices comprising a series of spaced keepers held to the vulcanizer-body and having inclined faces, and a latch-ring fitted revolubly to the door on an antifriction-bearing and having a series of spaced lugs provided with inclined faces adapted to simultaneously engage the inclined faces of all the keepers, substantially as described.

7. Vulcanizer-door-locking devices comprising a series of longitudinally-adjustable spaced keepers held to the vulcanizer-body and having inclined faces, and a latch-ring fitted revolubly to the door on an antifriction-bearing and having a series of spaced lugs provided with inclined faces adapted to simultaneously engage the inclined faces of all the keepers, said keepers having means taking the door-locking thrust and providing for setting them relatively to the coöperating inclined faces of the latch-ring lugs, substantially as described.

8. Vulcanizer-door-locking devices comprising a series of longitudinally-adjustable spaced keepers held to the vulcanizer-body and having inclined faces, and a latch-ring fitted revolubly to the hinged door and having a series of spaced lugs provided with inclined faces adapted to simultaneously engage the inclined faces of all the keepers, said keepers having means taking the door-locking thrust and providing for setting them relatively to the coöperating inclined faces of the latch-ring lugs, the hinges of the door having parts finally attachable after the keepers are adjusted to the latch-ring lugs, substantially as described.

9. In vulcanizer-door-locking devices, the combination, with the vulcanizer-body having guides 6, of keepers 5 having inclined lugs 16 and longitudinally movable in said guides, means holding the keepers in the guides set-bolts 10 taking the door-locking thrust on the keepers and determining their longitudinal adjustment, and a series of inclined lugs on the door movable relatively to the inclined lugs of the keepers and adapted to engage them for locking the door, substantially as described.

10. In vulcanizer-door-locking devices, the combination, with the vulcanizer-body having guides 6, of keepers 5 having inclined lugs 16 and longitudinally movable in said guides, means holding the keepers in the guides, set-bolts 10 taking the door-locking thrust on the keepers and determining their longitudinal adjustment, and a latch-ring 12 revoluble on the door and having a series of inclined lugs adapted to simultaneously engage the inclined lugs of all the keepers for locking the door, substantially as described.

11. In vulcanizer-door-locking devices, the combination, with the vulcanizer-body having guides 6, of keepers 5 having inclined lugs 16 and longitudinally movable in said guides, means holding the keepers in the guides, set-bolts 10 taking the door-locking thrust on the keepers and determining their longitudinal adjustment, and a latch-ring 12 revoluble on the door upon an interposed antifriction-bearing and having a series of inclined lugs adapted to simultaneously engage the inclined lugs of all the keepers for locking the door, substantially as described.

EDWIN COUPLAND SHAW.

Witnesses:
ALVIN K. GOODWIN,
OLIVER WILLIAMS.